United States Patent
Friman

(10) Patent No.: US 8,059,582 B2
(45) Date of Patent: Nov. 15, 2011

(54) PICO CELL SYSTEM ACCESS USING CELLULAR COMMUNICATIONS NETWORK

(75) Inventor: Leif Friman, Jarvenpaa (FI)

(73) Assignee: NOKIA Corporation, Espoo (FI)

( * ) Notice: Subject to any disclaimer, the term of this patent is extended or adjusted under 35 U.S.C. 154(b) by 612 days.

(21) Appl. No.: 11/714,727

(22) Filed: Mar. 7, 2007

(65) Prior Publication Data

US 2008/0161013 A1 Jul. 3, 2008

(30) Foreign Application Priority Data

Dec. 29, 2006 (EP) .................................. 06127341.3

(51) Int. Cl.
*H04W 4/00* (2009.01)
(52) U.S. Cl. ..................................... 370/328; 455/456.1
(58) Field of Classification Search .... 455/456.1–456.5, 455/436, 440, 452.2; 370/328
See application file for complete search history.

(56) References Cited

U.S. PATENT DOCUMENTS

| | | | | |
|---|---|---|---|---|
| 6,813,501 B2* | 11/2004 | Kinnunen et al. | ......... | 455/456.2 |
| 6,904,029 B2* | 6/2005 | Fors et al. | ..................... | 370/331 |
| 7,089,005 B2* | 8/2006 | Reddy | ............................. | 455/436 |
| 7,146,130 B2* | 12/2006 | Hsu et al. | ..................... | 455/3.04 |
| 7,266,101 B2* | 9/2007 | Dorenbosch | .................. | 370/331 |
| 7,505,433 B2* | 3/2009 | Yaqub et al. | .................. | 370/331 |
| 7,590,708 B2* | 9/2009 | Hsu | ............................... | 709/218 |
| 2004/0023669 A1* | 2/2004 | Reddy | ........................ | 455/456.1 |
| 2004/0104841 A1* | 6/2004 | Syrjarinne | ............... | 342/357.13 |
| 2004/0137901 A1* | 7/2004 | Hamasaki et al. | ............ | 455/436 |
| 2005/0053099 A1* | 3/2005 | Spear et al. | ................... | 370/508 |
| 2005/0239461 A1* | 10/2005 | Verma et al. | ............... | 455/435.1 |
| 2005/0250496 A1* | 11/2005 | Hason et al. | .................. | 455/436 |
| 2006/0227745 A1* | 10/2006 | Olvera-Hernandez et al. | ............................ | 370/331 |

* cited by examiner

*Primary Examiner* — Jean A Gelin
*Assistant Examiner* — Nathan Taylor
(74) *Attorney, Agent, or Firm* — Squire, Sanders & Dempsey (US) LLP

(57) ABSTRACT

A network device sends information on at least one cell of second cell layer of a second technology access network, the at least one cell of second cell layer being located in an area of a cell of first cell layer of a first technology access network, wherein the information comprises location information of the at least one cell of second cell layer. A mobile device receives this information and performs calculations based on this information serving to aid in a process of entering into a wanted cell of the second cell layer.

18 Claims, 5 Drawing Sheets

PICO CELL SYSTEM ACCESS USING CELLULAR COMMUNICATIONS NETWORK

The present invention relates to accessing a pico cell system such as UMA (Unlicensed Mobile Access), WLAN (Wireless Local Area Network) and BlueTooth® cell system, the access being based on information available from a cellular communications system such as GSM (Global System for Mobile communications) having much larger cells than the pico cell system.

The current development towards truly mobile computing and networking has brought on the evolvement of various access technologies that provide the users with access to the Internet, real-time and other telecommunications services also when they are outside their home network.

An example of mobile network technologies enabling Internet access is GPRS (General Packet Radio Service). GPRS aims at providing high-quality services for present GSM subscribers by efficiently utilizing the current network infrastructure and protocols. GPRS has evolved from GSM with the introduction of two new network elements: SGSN (Serving GPRS Support Node) and GGSN (Gateway GPRS Support Node). These elements will also provide packet-based services in the upcoming UMTS (Universal Mobile Telecommunication System) networks.

What is known as multimode radio technology is also becoming more and more common in user devices. Having his or her mobile terminal equipped with a multimode radio technology, the user can choose the most suitable network type in each case, i.e. the user can choose whether the services are accessed through GPRS, UMA, WLAN or BlueTooth®, for example. For instance, the user may sometimes prefer the higher data rate offered by the WLAN networks.

Moreover, UMA is an industry collaboration to extend GSM and GPRS services into customer sites by utilizing unlicensed radio technologies such as Wi-Fi (Wireless Fidelity) and Bluetooth®. This is achieved by tunneling GSM and GPRS protocols through a broadband IP (Internet Protocol) network towards an Access Point situated in the customer site and across the unlicensed radio link to a mobile device.

In the conventional GSM system, cells are indicated in GSM system information messages sent on (P) BCCH ((Packet) Broadcast Control CHannel). The problem is that the GSM cell is much larger than the pico cell and so the number of pico cells inside a GSM cell can be very high.

Thus, in case the GSM system indicates to the mobile device that 'there is a UMA/WLAN cell as a neighbor', e.g. using only one dummy GSM neighbor, UMA/WLAN access can be erratic and time consuming as the mobile can easily be outside the range of the indicated UMA/WLAN cell. The process of searching the UMA/WLAN cell also increases the power consumption of the mobile device, since it may be necessary to activate a second radio transceiver in the device.

Moreover, as there could be very many (even hundreds) pico cells, with the conventional pico cell indication there is a problem in case the user of the mobile device is interested in a certain UMA/WLAN cell, e.g. a cell which provides a special service.

According to the invention, a network device sends information on at least one cell of second cell layer of a second technology access network, the at least one cell of second cell layer being located in an area of a cell of first cell layer of a first technology access network, wherein the information comprises location information of the at least one cell of second cell layer. A mobile device receives this information and performs calculations based on this information serving to aid in a process of entering into a wanted cell of the second cell layer.

According to the present invention the number of pico cells that the mobile device will try to search and access can be limited. Moreover, the invention enables turning on UMA/WLAN radio only close to a desired UMA/WLAN cell. Thus, network load can be reduced and mobile device resources can be saved.

BRIEF DESCRIPTION OF THE DRAWINGS

In the following the invention is described by way of embodiments thereof, referring to the accompanying drawings, in which.

DETAILED DESCRIPTION OF EMBODIMENTS

Figure 1:
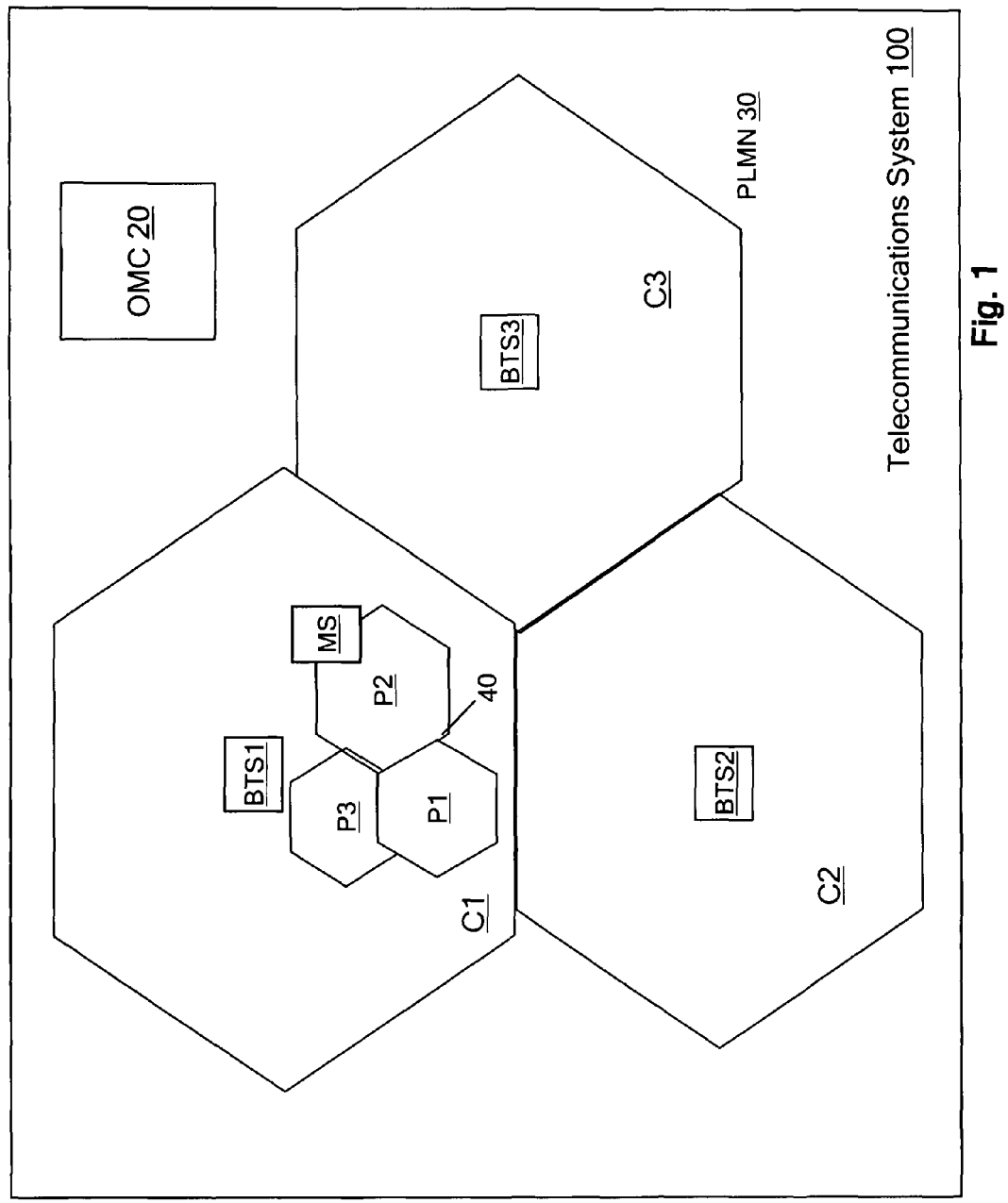
FIG. 1 shows a schematic block diagram illustrating a telecommunications system according to an embodiment of the invention.

FIG. 1 shows a simplified version of a GSM/UMTS (first technology) and WLAN/UMA (second technology) access network architecture. Those skilled in the art know that a general mobile communication system and a WLAN/UMA system also comprise other functions and structures, which do not have to be described in more detail herein. Referring to FIG. 1, a telecommunications system 100 according to an embodiment of the invention comprises a mobile communications network PLMN 30 and an external access network 40 such as WLAN, UMA or BlueTooth®. The mobile network PLMN 30 comprises cells C1, C2, C3, the area of each cell being defined by the coverage area of respective base transceiver stations BTS1, BTS2, BTS3. In FIG. 1, a situation is shown where a user terminal MS is located in cell C1. The user terminal may be in the active mode or in the idle mode. The idle mode refers to a standby state of the user terminal MS when it is not actively processing a call.

The user terminal MS keeps receiving signals from base transceiver station BTS1 of the current cell C1 and from base transceiver stations BTS2, BTS3 of the other nearby cells C2, C3 as well. The signals of C2 and C3 comprise neighbor cell information, by means of which the user terminal MS is able to find out about the neighbor cells C2, C3, and perform signal measurements e.g. on their signal strength and signal quality at the current location of the user terminal MS. The external access network 40, which is an external network to the mobile communications network PLMN 30, comprises the cumulative coverage area of the respective cells P1, P2, P3. In FIG. 1, the access network 40 is overlapping with cell C1 of the mobile network 30.

Moreover, the telecommunications system 100 comprises a device 20 such as an OMC (Operations and Maintenance Centre), which may calculate timing advance values or store and provide geographic location (coordinates) for the cells P1 to P3 which will be described below.

Figure 2:
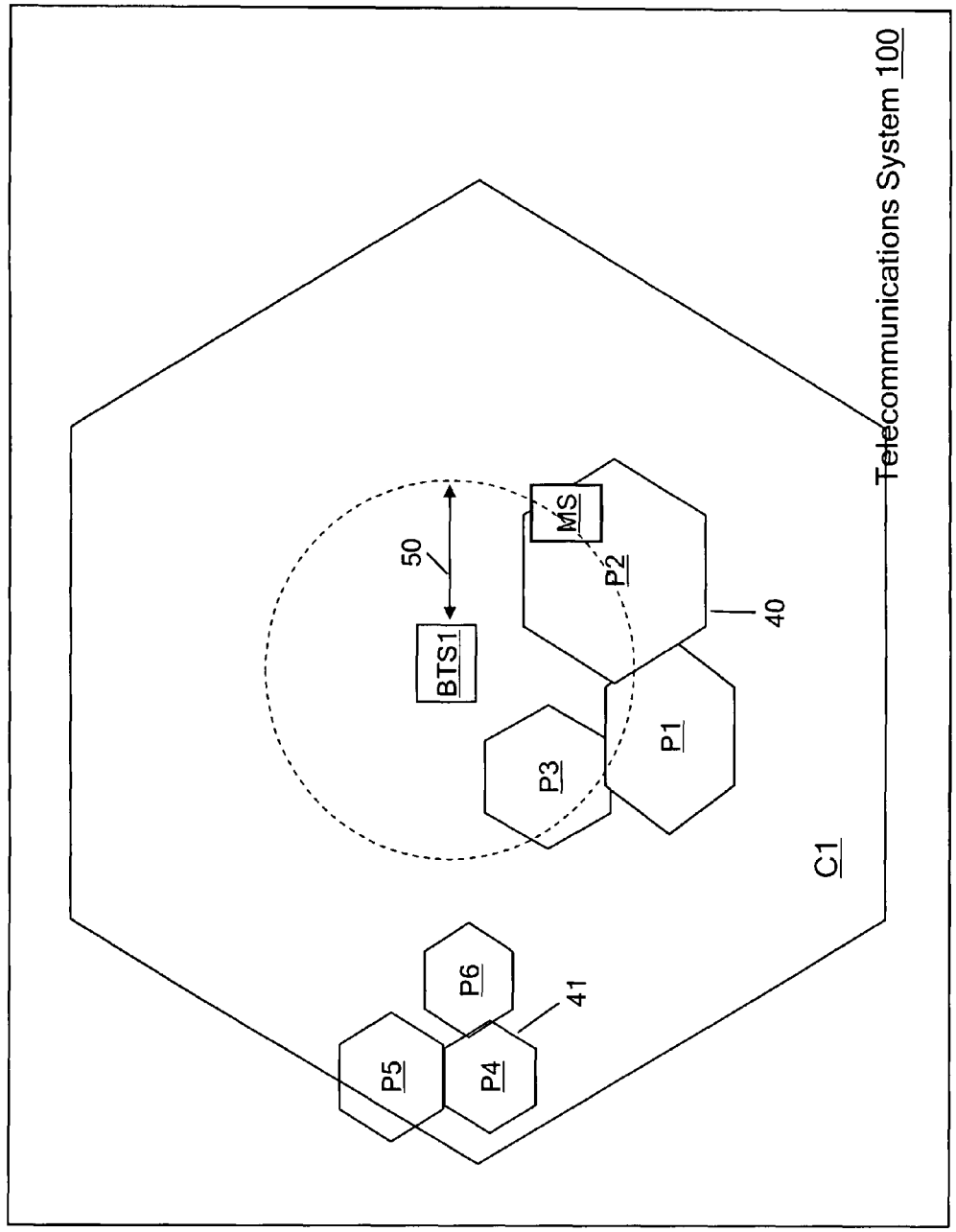
FIG. 2 shows a schematic block diagram illustrating cell C1 of the telecommunications system shown in FIG. 1 in greater detail.

FIG. 2 shows cell C1 in greater detail. According to FIGS. 1 and 2, BTS1 of cell C1 comprises an omnidirectional antenna, so the area of C1 is essentially circular. As shown in FIG. 2, besides the cells P1 to P3 there are also cells P4 to P6 belonging to an external access network 41 which is different from the PLMN 30. The MS is located nearby cell P2 of the access network 40.

The invention deals with measuring, detecting and accessing the cells P1 to P3 and P4 to P6 where this process is based on information available from GSM system information (P) SI ((Packet) System Information) provided by the PLMN 30.

According to the present invention the number of pico cells that the mobile terminal will try to search and access can be limited. This limitation is based on an estimated location of the mobile terminal inside the GSM cell. There are different methods of determining the location of the mobile terminal comprising location determination based on received power level, timing advance value (TA) or real measured position using any positioning system e.g. GPS (Global Positioning System) equipment. However, power level is not reliable and GPS is not always available.

According to one embodiment of the invention, a current value of GSM timing advance (TA) is used for location determination. In FIG. 2, the distance 50 indicates the TA value indicating an estimated distance from BTS1 to MS. Then, in an implementation example of the invention, a system information message, e.g. a Non-GSM system information message, describes for each pico cell ARFCN (Absolute Radio Frequency Channel Number) also the TA range for that pico cell. Thus, in effect, the TA range defines a ring shaped GSM cell area where the particular pico cells actually are located. According to FIG. 2, the pico cells P1 to P3 are located close to the TA range of the MS to the BTS1, whereas the cells P4 to P6 are located away from this TA range. Thus, according to the invention, the pico cells P1 to P3 of access network 40 can be listed to be available, whereas the cells P4 to P6 are ruled out.

The drawback of course is that within this ring shaped area more accurate location estimate is not readily possible, i.e. non-optimal pico cell areas may be located within the ring shaped area. For example P3 in FIG. 2 would not be available for MS in its current location although listed as a candidate. But even with this limitation the number of pico cell candidates is greatly reduced and searching those for access is easier and faster.

According to an embodiment, if e.g. GPS location is available, then the pico cell coordinates are sent in system information additionally. If the MS has a GPS receiver or other positioning means for determining its location, it may decide to access the closest pico cells.

Figure 3:
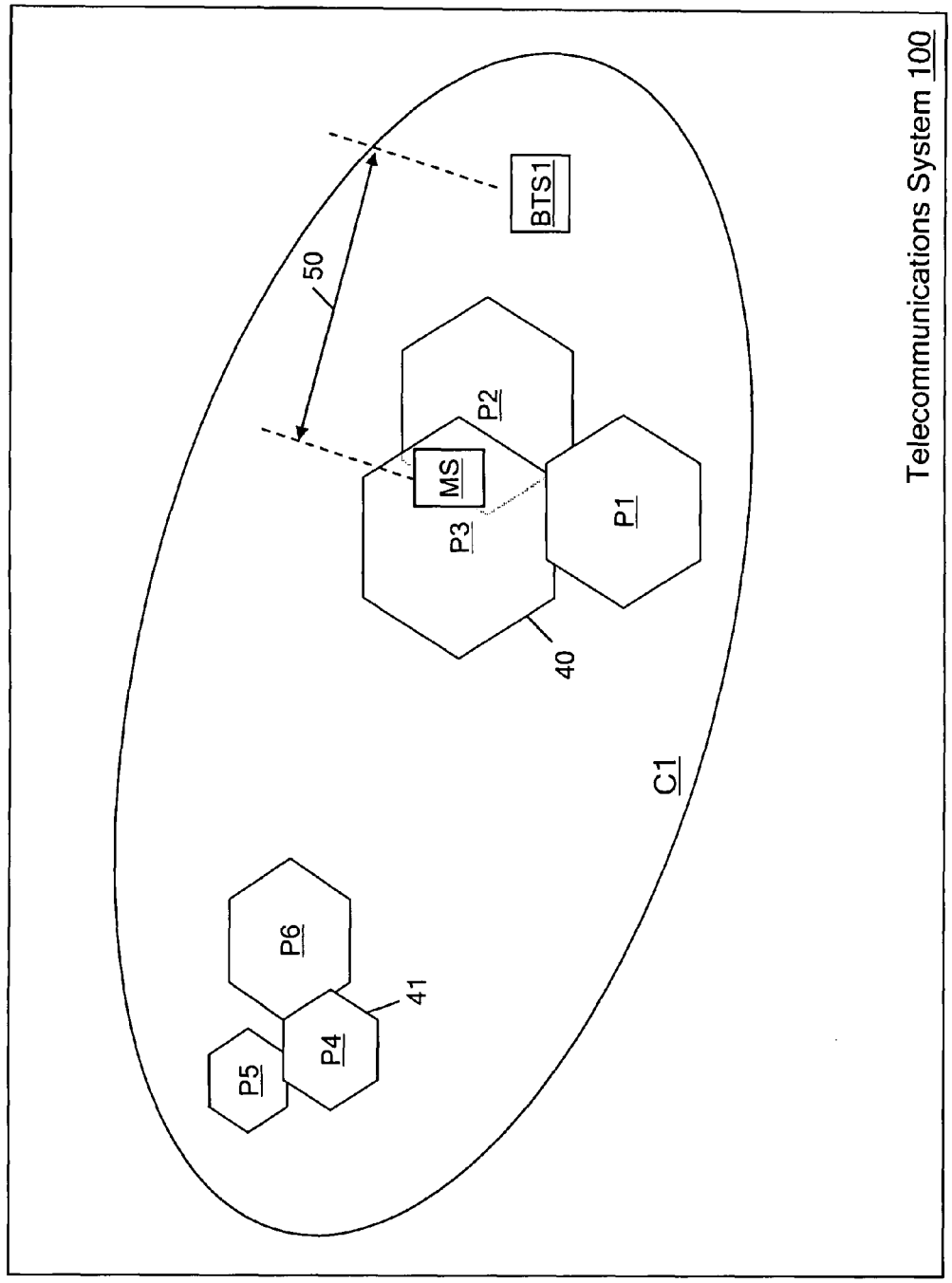
FIG. 3 shows a schematic block diagram illustrating a telecommunications system according to an embodiment of the invention in which cell C1 is sector-shaped (drawn as oval).

FIG. 3 shows a schematic block diagram illustrating a telecommunications system according to an embodiment of the invention in which the BTS1 has a directional antenna. Therefore the cell C1 is sector-shaped, although drawn as oval in FIG. 3. FIG. 3 shows one sector of BTS1. Reference sign 50 indicates the estimate of a distance from MS to BTS1, measured by TA. According to this embodiment, pico cells P1 to P3 of access network 40 can be determined to be located near the MS (and not only near the TA range of the MS). Thus, in a sector-shaped cell are, TA alone leads to more exact location determination.

According to an implementation example, information on pico neighbour cells P1 to P3, i.e. various access information and TA range, are included in a Non-GSM system information message sent from the base transceiver station BTS1 to the mobile station MS.

In the following provision of TA values of the pico cells P1 to P3 to the MS is described by referring to FIG. 4.

In a first step (not shown in FIG. 4), location of pico cells located in the area of the PLMN 30 is indicated to the OMC 20 shown in FIG. 1. Only location of pico cells which e.g. provide a special service may be indicated. In a next step, the OMC 20 calculates under which PLMN cell C1 to C3 the pico cell P1 to P6 is located, and calculates a corresponding Timing Advance value indicating a distance from the pico cell to the BTS of the cell (process 1 in FIG. 4).

Alternatively or in addition, the coordinates of each pico cell are provided to the OMC either by operating personnel or automatically. The coordinates may be determined for example by GPS or Galileo satellite positioning system or some other means. The OMC (or server 60 in FIG. 4) stores this information and provides it to BSCs.

Figure 4:
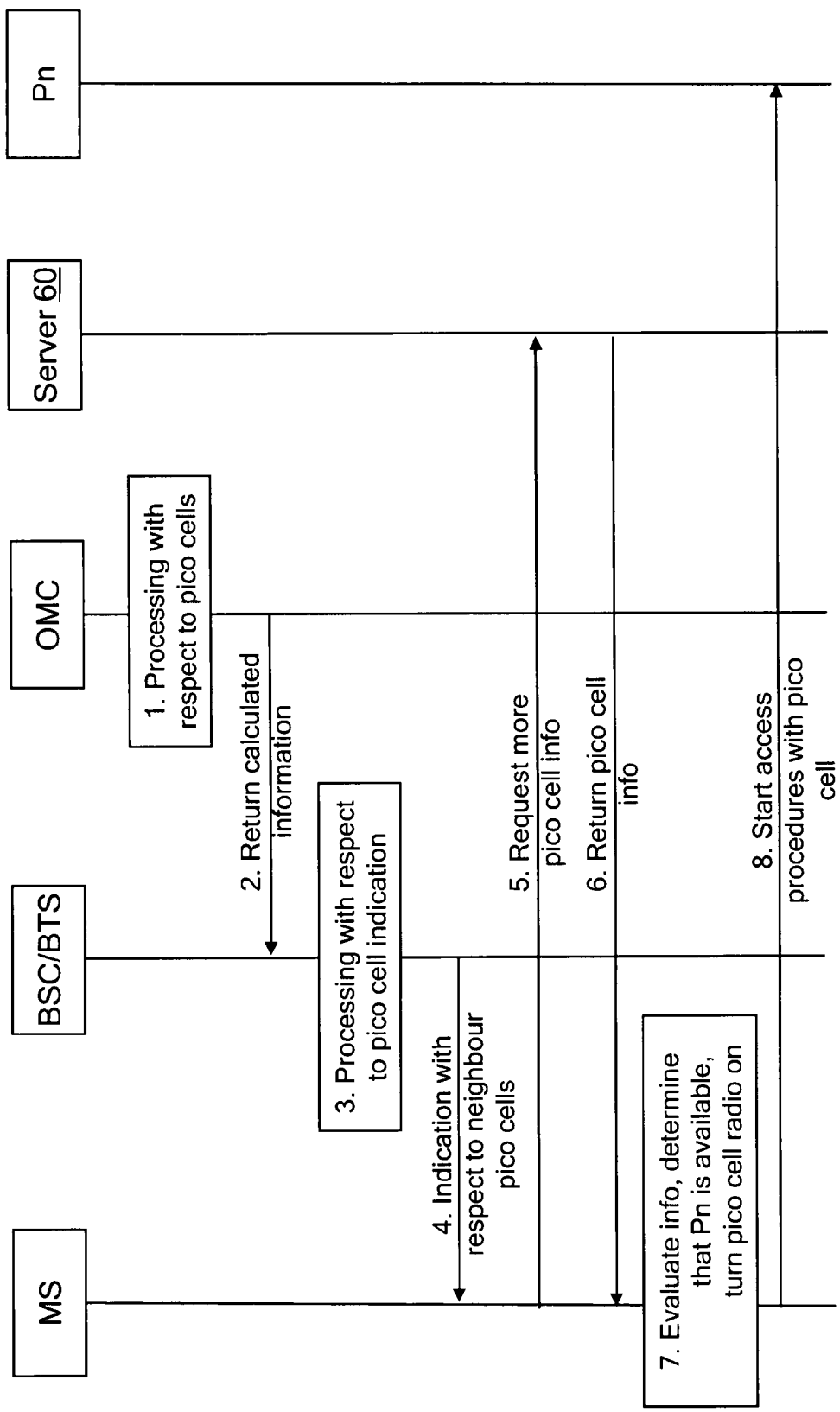
FIG. 4 shows a signaling diagram illustrating processes and communications according to an embodiment of the invention.

The OMC 20 returns the calculated information to appropriate BSCs (Base Station Controllers) (not shown in FIG. 1) of the base transceiver stations BTS1 to BTS3 (communication 2 in FIG. 4). The BSC performs processing with respect to pico cell information provided by the OMC 20 (process 3 in FIG. 4), and then may forward this information (e.g. information with respect to neighbor pico cells) to the MS via a corresponding BTS using suitable system information messages, such as SI18 on ext BCCH, or Non-GSM system information on BCCH (communication 4 in FIG. 4). Hence, the information contains identity of the pico cell, the TA for this pico cell and possibly even coordinates for this pico cell for MS with GPS capability.

In case there are not too many pico cells which are close to the MS or TA range of the MS, the BSC or BTS may send the TA values using BCCH (or BCCH-ext). However, if the number of pico cells is large, the BSC or BTS may just indicate that 'cells exist' e.g. by indicating some of them and a 'more' bit on the BCCH (or BCCH-ext). Then the MS may request more information e.g. by setting up a packet call session to a server 60 that stores the information for the rest of the pico cells (communication 5 in FIG. 4), and the server 60 may return the requested information in a communication 6 in FIG. 4.

According to an embodiment of the invention, a cell, e.g. cell C1, where the MS is present in idle state indicates to the MS that there are pico cells under this cell via BCCH or ext BCCH as described above. Then the MS, e.g. a UMA/WLAN application in the MS, may activate GPRS and ask for details. As described above, this procedure may comprise setting up a packet call session to the server 60 that stores the information about the pico cells. The details may include TA values of the pico cells P1 to P3 transmitted via BCCH or ext BCCH as described above. The details may also include geographical coordinates for the pico cells P1 to P3. The details are communicated to MS (communication 6 in FIG. 4).

Note, that the steps 5 and 6 described above are optional. The BTS may have all information available and provide it to the MS already in communication 4.

In a process 7 in FIG. 4, the MS may then compare the geographical coordinates of the candidate pico cells with the coordinates of the MS location provided by the GPS receiver of the MS and decide which pico cell is close to the MS for successful access. If one or more of them are probably available, it may turn the UMA/WLAN access radio transceiver on and try to connect one of them (communication 8 in FIG. 4, in which the MS starts access procedures with pico cell Pn).

As mentioned above, in case the MS does not comprise a GPS receiver, the location of the MS may be calculated in the PLMN 30 by SMLC (Serving Mobile Location Centre) server which may be located in the BSC, using e.g. TA, and only pico cells (e.g. cells P1 to P3) that are close to the MS may be indicated to the MS (process 3 in FIG. 4). The indication may also be just a bit with meaning 'pico cell (allowed access) close by, pico cell system radio may be started'.

In case the MS is DTM (Dual Transfer Mode) capable same procedure as described above for the idle state is possible during active state e.g. during an active speech call. If the MS in not DTM capable, it has to rely on receiving information on pico cells via SACCH (Slow Associated Control CHannel). For this purpose, one of messages sent via SACCH to the mobile is enhanced to carry the needed information. Alternatively, a new message is defined for carrying this information.

Figure 5:
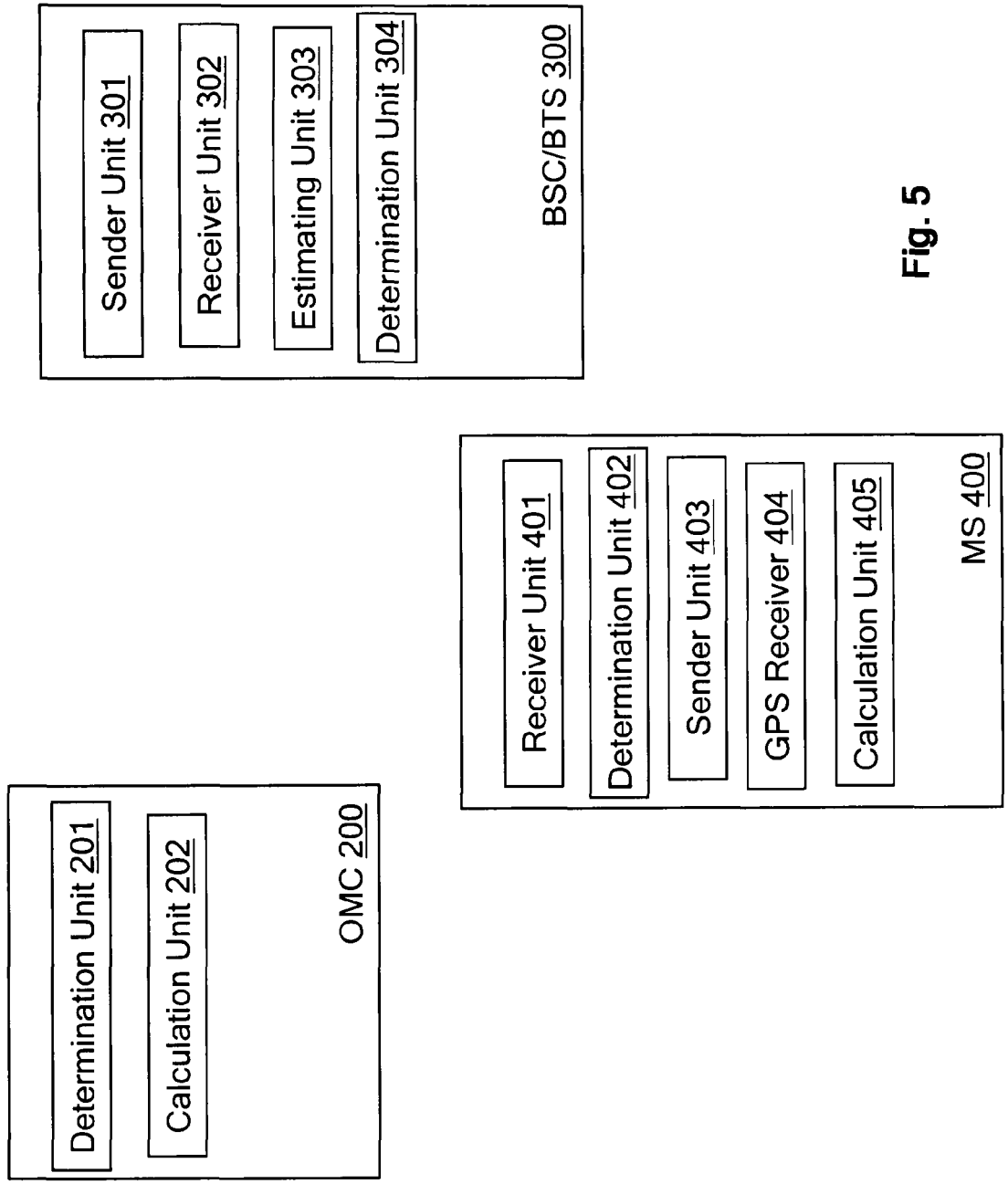
FIG. 5 shows a schematic block diagram illustrating an OMC 200, a BTS 300 and an MS 400 according to an embodiment of the invention.

FIG. 5 shows a schematic block diagram illustrating an OMC 200, a BSC/BTS 300 and an MS 400 according to an embodiment of the invention.

The OMC 200 comprises a determination unit 201 configured to determine for a cell of first cell layer of a first technology access network at least one cell of second cell layer of a second technology access network, the at least one cell of second cell layer being located in the area of the cell of first cell layer, and a calculation unit 202 configured to calculate location information of the at least one cell of second cell layer.

The location information may comprise a timing advance value.

The determination unit 201 may be configured to determine if the at least one cell of second cell layer is a specific cell offering a specific service and to cause the calculation unit 202 to calculate the location information of the at least one cell of second cell layer only in case the at least one cell of second cell layer is the specific cell.

The BSC/BTS 300 comprises a sender unit 301 configured to send information on at least one cell of second cell layer of a second technology access network, the at least one cell of second cell layer being located in an area of a cell of first cell layer of a first technology access network, wherein the information comprises location information of the at least one cell of second cell layer.

The sender unit 301 may be configured to send an indication that at least one cell of second cell layer is present in the area of the cell of first cell layer instead of sending the information on the at least one cell of second cell layer.

The BSC/BTS 300 may further comprise a receiver unit 302 configured to receive a message requesting the information on the at least one cell of second cell layer, wherein the sender unit 301 may be further configured to send the information on the at least one cell of second cell layer in response to the message.

The information on the at least one cell of second cell layer may further comprise geographical coordinates of the at least one cell of second cell layer.

The BSC/BTS may further comprise an estimating unit 303 configured to estimate a location of a mobile device, and a determination unit 304 configured to determine if the at least one cell of second cell layer is close to the location of the mobile device and to cause the sender unit 301 to send the information on the at least one cell of second cell layer only in case the at least one cell of second cell layer is close to the location of the mobile device.

The determination unit 304 may be configured to determine if the at least one cell of second cell layer is a specific cell offering a specific service and to cause the sender unit 301 to send the information on the at least one cell of second cell layer only in case the at least one cell of second cell layer is the specific cell.

The cell of first cell layer may be a GSM cell and the at least one cell of second cell layer may be a UMA cell and the sender unit 301 may be configured to send the information on the at least one cell of second cell layer in a non GSM system information message via a broadcast control channel, via a slow associated control channel or via an extended broadcast control channel.

The MS 400 comprises a receiver unit 401 configured to receive information on at least one cell of second cell layer of a second technology access network, the at least one cell of second cell layer being located in an area of a cell of first cell layer of a first technology access network in which the mobile device is located, wherein the information comprises location information of the at least one cell of second cell layer.

The receiver unit 401 may be configured to receive an indication that at least one cell of second cell layer is present in the area of the cell of first cell layer instead of receiving the information on the at least one cell of second cell layer.

The MS 400 may further comprise a determination unit 402 configured to initiate access to the at least one cell of second cell layer based on the indication.

The determination unit 402 may be configured to determine if the at least one cell of second cell layer is a specific cell offering a specific service and to initiate access to the at least one cell of second cell layer only in case the at least one cell of second cell layer is the specific cell.

The MS 400 may further comprise a sender unit 403. The determination unit 402 may be configured to cause the sender unit 403 to send a message requesting the information on the at least one cell of second cell layer based on the indication.

The determination unit 402 may be configured to cause the sender unit 403 to send a message requesting the information on the at least one cell of second cell layer only in case the at least one cell of second cell layer is the specific cell.

The MS 400 may further comprise a GPS receiver 404 or other positioning device configured to calculate coordinate values of a location of the MS 400, and a calculation unit 405 configured to compare the coordinate values with the geographical coordinates of the at least one cell of second cell layer and decide that the at least one cell of second cell layer is close to the location of the MS 400 based on a comparison result.

The determination unit 402 may be configured to initiate access to the at least one cell of second cell layer based on a decision that the at least one cell of second cell layer is close to the location of the mobile device.

The cell of first cell layer may be a GSM cell and the at least one cell of second cell layer may be a UMA cell and the receiver unit 401 may be configured to receive the information on the at least one cell of second cell layer in a non GSM system information message via a broadcast control channel.

The cell of first cell layer may be a GSM cell and the at least one cell of second cell layer may be a UMA cell and the receiver unit 401 may be configured to receive the information on the at least one cell of second cell layer via a slow associated control channel.

The cell of first cell layer may be a GSM cell and the at least one cell of second cell layer may be a UMA cell and the receiver unit 401 may be configured to receive the indication via an extended broadcast control channel. It is to be noted that the network devices and the mobile device shown in FIG. 5 may have further functionality for working e.g. as OMA, BSC/BTS and MS devices. Here the functions of the network devices and the mobile device relevant for understanding the principles of the invention are described using functional blocks as shown in FIG. 5. The arrangement of the functional blocks of the network devices is not construed to limit the invention, and the functions may be performed by one block or further split into sub-blocks.

For the purpose of the present invention described above, it should be noted that method steps likely to be implemented as software code portions and being run using a processor at one of the server/client entities are software code independent and can be specified using any known or future developed programming language;

method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

The term "computer readable storage medium" as used herein should be understood not to include transitory signals.

It is to be understood that the above description is illustrative of the invention and is not to be construed as limiting the invention. Various modifications and applications may occur to those skilled in the art without departing from the scope of the invention as defined by the appended claims.

The invention claimed is:

1. An apparatus comprising:
a processor; and
a memory including computer program code,
the memory and the computer program code configured to, with the processor, cause the apparatus at least to
process a received message that requests information on at least one cell of second cell layer of a second technology access network, the at least one cell of second cell layer being located in an area of a cell of first cell layer of a first technology access network, and
send information on the at least one cell of second cell layer in response to the message, wherein the sent information comprises relative location information of the at least one cell of second cell layer relative to the cell of first cell layer of the first technology access network, the relative location information comprising a timing advance value, wherein the timing advance defines a ring-shaped area around a base node of the first technology,
wherein the apparatus is comprised in the base node of the first technology access network, wherein the first technology comprises a cellular technology and the request is received, and the information sent, using the cellular technology.

2. The apparatus of claim 1, wherein the information on the at least one cell of second cell layer further comprises geographical coordinates of the at least one cell of second cell layer.

3. The apparatus of claim 1, wherein the memory and the computer program code are further configured to, with the processor, cause the apparatus at least to:
estimate a location of a mobile device; and
determine whether the at least one cell of second cell layer is close to the location of the mobile device and to send the information on the at least one cell of second cell layer only in case the at least one cell of second cell layer is close to the location of the mobile device.

4. The apparatus of claim 1, wherein the memory and the computer program code are further configured to, with the processor, cause the apparatus at least to:
determine whether the at least one cell of second cell layer is a specific cell offering a specific service and to send the information on the at least one cell of second cell layer only in case the at least one cell of second cell layer is the specific cell.

5. The apparatus of claim 1, wherein the cell of first cell layer is a global system for mobile communications cell and the at least one cell of second cell layer is an unlicensed mobile access cell and the memory and the computer program code are further configured to, with the processor, cause the apparatus at least to send the information on the at least one cell of second cell layer in a non global system for mobile communications system information message via a broadcast control channel.

6. The apparatus of claim 1, wherein the cell of first cell layer is a global system for mobile communications cell and the at least one cell of second cell layer is an unlicensed mobile access cell and the memory and the computer program code are further configured to, with the processor, cause the apparatus at least to send the information on the at least one cell of second cell layer via a slow associated control channel.

7. The apparatus of claim 1, wherein the cell of first cell layer is a global system for mobile communications cell and the at least one cell of second cell layer is an unlicensed mobile access cell and the wherein the memory and the computer program code are further configured to, with the processor, cause the apparatus at least to send the indication via an extended broadcast control channel.

8. A method comprising:
receiving a message requesting information on at least one cell of second cell layer of a second technology access network, the at least one cell of second cell layer being located in an area of a cell of first cell layer of a first technology access network; and
sending the information on the at least one cell of second cell layer in response to the message, wherein the sent information comprises relative location information of the at least one cell of second cell layer relative to the cell of first cell layer of the first technology access network, the relative location information comprising a timing advance value, wherein the timing advance defines a ring-shaped area around a base node of the first technology,
wherein the method is performed in the base node of the first technology access network, wherein the first technology comprises a cellular technology and the request is received, and the information sent, using the cellular technology.

9. The method of claim 8, comprising:
receiving a message requesting the information on the at least one cell of second cell layer; and
sending the information on the at least one cell of second cell layer in response to the message.

10. The method of claim 8, wherein the information on the at least one cell of second cell layer further comprises geographical coordinates of the at least one cell of second cell layer.

11. The method of claim 8, comprising:
estimating a location of a mobile method; and
determining whether the at least one cell of second cell layer is close to the location of the mobile method and sending the information on the at least one cell of second cell layer only in case the at least one cell of second cell layer is close to the location of the mobile method.

12. The method of claim 8, comprising:
determining whether the at least one cell of second cell layer is a specific cell offering a specific service and sending the information on the at least one cell of second cell layer only in case the at least one cell of second cell layer is the specific cell.

13. The method of claim 8, wherein the cell of first cell layer is a global system for mobile communications cell and the at least one cell of second cell layer is an unlicensed mobile access cell, the method comprising sending the information on the at least one cell of second cell layer in a non global system for mobile communications system information message via a broadcast control channel.

14. The method of claim 8, wherein the cell of first cell layer is a global system for mobile communications cell and the at least one cell of second cell layer is an unlicensed mobile access cell, and the method comprising sending the information on the at least one cell of second cell layer via a slow associated control channel.

15. The method of claim 8, wherein the cell of first cell layer is a global system for mobile communications cell and the at least one cell of second cell layer is an unlicensed mobile access cell, and the method comprising sending the indication via an extended broadcast control channel.

16. A computer-readable non-transitory medium encoded with instructions configured to control a processor to perform a process, the process comprising:
processing a received message that requests information on at least one cell of second cell layer of a second technology access network, the at least one cell of second cell layer being located in an area of a cell of first cell layer of a first technology access network; and
sending information on the at least one cell of second cell layer in response to the message, wherein the sent information comprises relative location information of the at least one cell of second cell layer relative to the cell of first cell layer of the first technology access network, the relative location information comprising a timing advance value, wherein the timing advance defines a ring-shaped area around a base node of the first technology,
wherein the processor is comprised in the base node of the first technology access network, wherein the first technology comprises a cellular technology and the request is received, and the information sent, using the cellular technology.

17. The computer-readable non-transitory medium according to claim 16, wherein the program is directly loadable into an internal memory of the processing device.

18. A semiconductor chips comprising:
a receiving unit configured to receive a message that requests information on at least one cell of second cell layer of a second technology access network, the at least one cell of second cell layer being located in an area of a cell of first cell layer of a first technology access network; and
a sending unit configured to send information on the at least one cell of second cell layer in response to the message, wherein the sent information comprises relative location information of the at least one cell of second cell layer relative to the cell of first cell layer of the first technology access network, the relative location information comprising a timing advance value, wherein the timing advance defines a ring-shaped area around a base node of the first technology,
wherein the semiconductor chip is comprised in the base node of the first technology access network, wherein the first technology comprises a cellular technology and the request is received, and the information sent, using the cellular technology.

* * * * *